(12) United States Patent
Bauer et al.

(10) Patent No.: US 9,045,082 B2
(45) Date of Patent: Jun. 2, 2015

(54) NON-INVASIVE HIGH INTENSITY LED DOCKING LIGHT AND METHOD FOR MOUNTING

(75) Inventors: Joshua G. Bauer, Ames, IA (US); Jerry Handsaker, Roland, IA (US)

(73) Assignee: Innovative Lighting, Inc., Roland, IA (US)

( * ) Notice: Subject to any disclaimer, the term of this patent is extended or adjusted under 35 U.S.C. 154(b) by 1080 days.

(21) Appl. No.: 12/701,798

(22) Filed: Feb. 8, 2010

(65) Prior Publication Data

US 2011/0193480 A1  Aug. 11, 2011

(51) Int. Cl.
*B63B 45/04* (2006.01)
*B60Q 1/26* (2006.01)

(52) U.S. Cl.
CPC ............ *B60Q 1/2615* (2013.01); *B60Q 1/2696* (2013.01)

(58) Field of Classification Search
CPC .................................. B63B 45/04; F21L 15/08
USPC .................. 362/477, 249.01, 249.02
See application file for complete search history.

(56) References Cited

U.S. PATENT DOCUMENTS

| | | | |
|---|---|---|---|
| 1,133,536 A | 3/1915 | Chase | |
| 4,445,163 A * | 4/1984 | Ziaylek, Jr. | 362/287 |
| 4,763,233 A | 8/1988 | Poyer | |
| 5,101,326 A * | 3/1992 | Roney | 362/545 |
| 5,268,824 A | 12/1993 | Czipri | |
| 5,285,359 A | 2/1994 | Czipri | |
| 5,672,004 A | 9/1997 | Schmidt, Jr. | |
| 6,030,099 A | 2/2000 | McDermott | |
| 6,231,217 B1 * | 5/2001 | Krippelz, Sr. | 362/477 |
| 6,394,634 B2 | 5/2002 | Kitchin | |
| 6,461,029 B2 | 10/2002 | Gronemeier et al. | |
| 6,637,915 B2 | 10/2003 | von Wolske | |
| 6,655,824 B2 * | 12/2003 | Tufte | 362/505 |
| 7,021,236 B1 | 4/2006 | Czipri | |
| 7,021,801 B2 | 4/2006 | Mohacsi | |
| 7,044,623 B2 | 5/2006 | Olsson et al. | |
| 7,134,769 B2 | 11/2006 | Rohlfing et al. | |
| 7,296,908 B1 * | 11/2007 | Pickard et al. | 362/183 |
| 7,401,949 B2 * | 7/2008 | Tufte | 362/369 |
| 7,425,718 B1 * | 9/2008 | Baley et al. | 250/504 R |
| 8,072,124 B2 * | 12/2011 | Liu et al. | 313/46 |
| 8,167,468 B1 * | 5/2012 | Olsson et al. | 362/477 |
| 8,277,098 B2 * | 10/2012 | Ortwein et al. | 362/477 |
| 2005/0013136 A1 * | 1/2005 | Rutchik | 362/365 |
| 2007/0068183 A1 * | 3/2007 | Andersen et al. | 62/228.1 |
| 2009/0116243 A1 * | 5/2009 | Condon et al. | 362/294 |
| 2011/0096559 A1 * | 4/2011 | Peng | 362/477 |

* cited by examiner

*Primary Examiner* — Jong-Suk (James) Lee
*Assistant Examiner* — Leah S Macchiarolo
(74) *Attorney, Agent, or Firm* — Davis, Brown, Koehn, Shors & Roberts, P.C.

(57) ABSTRACT

A hull mounted light for illuminating a place of portage to which a watercraft would come to dock. The docking light includes high intensity LED light sources for efficient illumination, an illuminated surface area on the exterior of the apparatus, a combination of circuits that compensates for the irregular operation of the watercrafts electrical system and a method of mounting that allows for adjustment after being operationally verified.

5 Claims, 9 Drawing Sheets

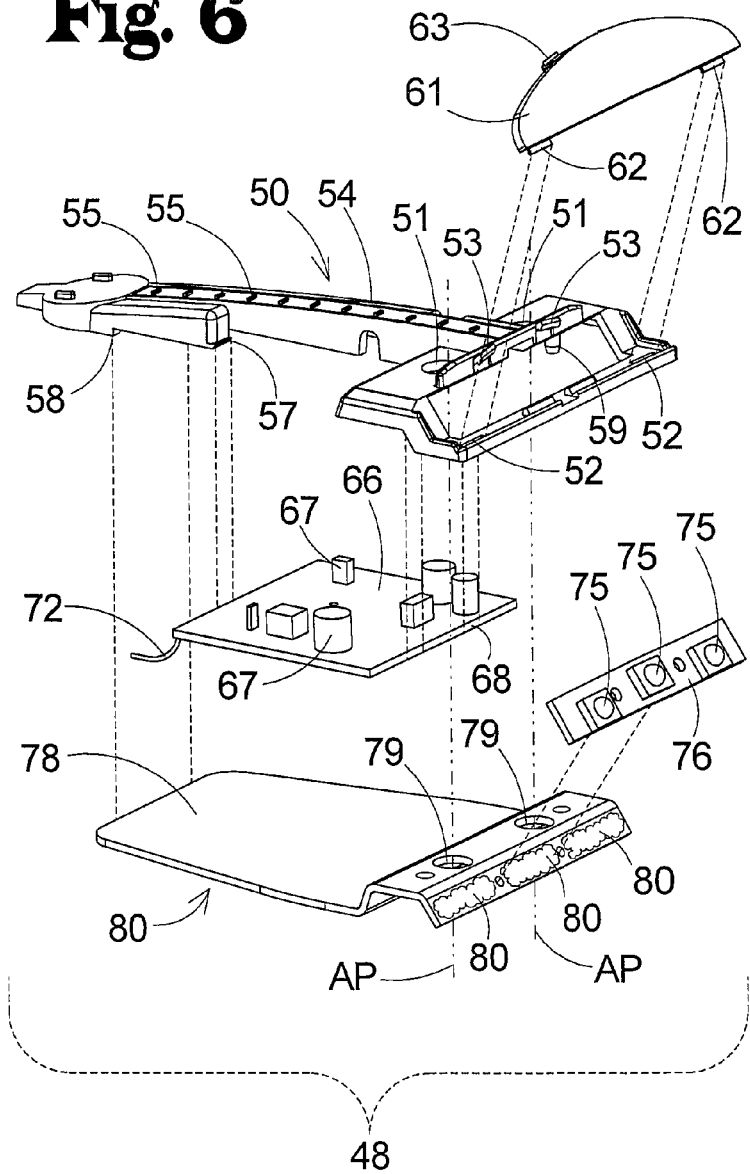

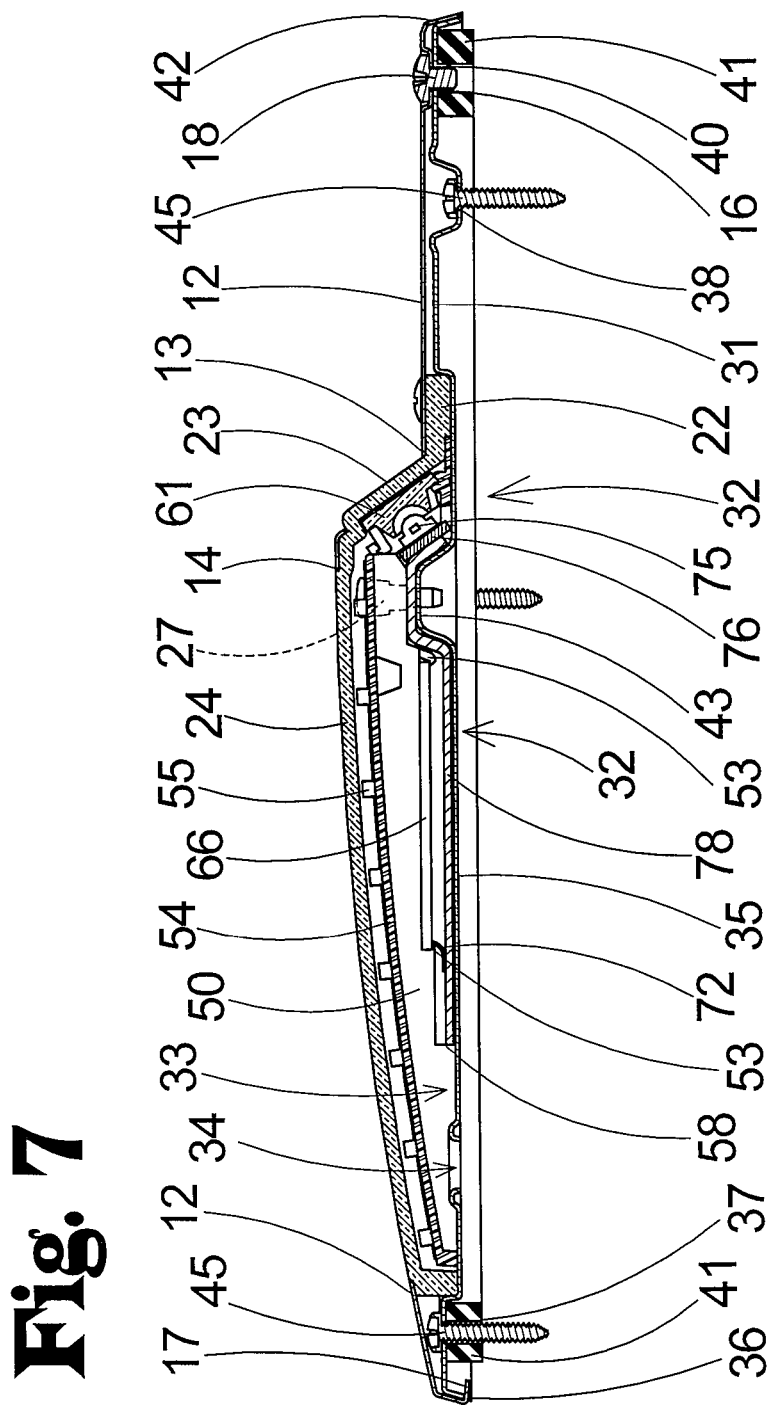

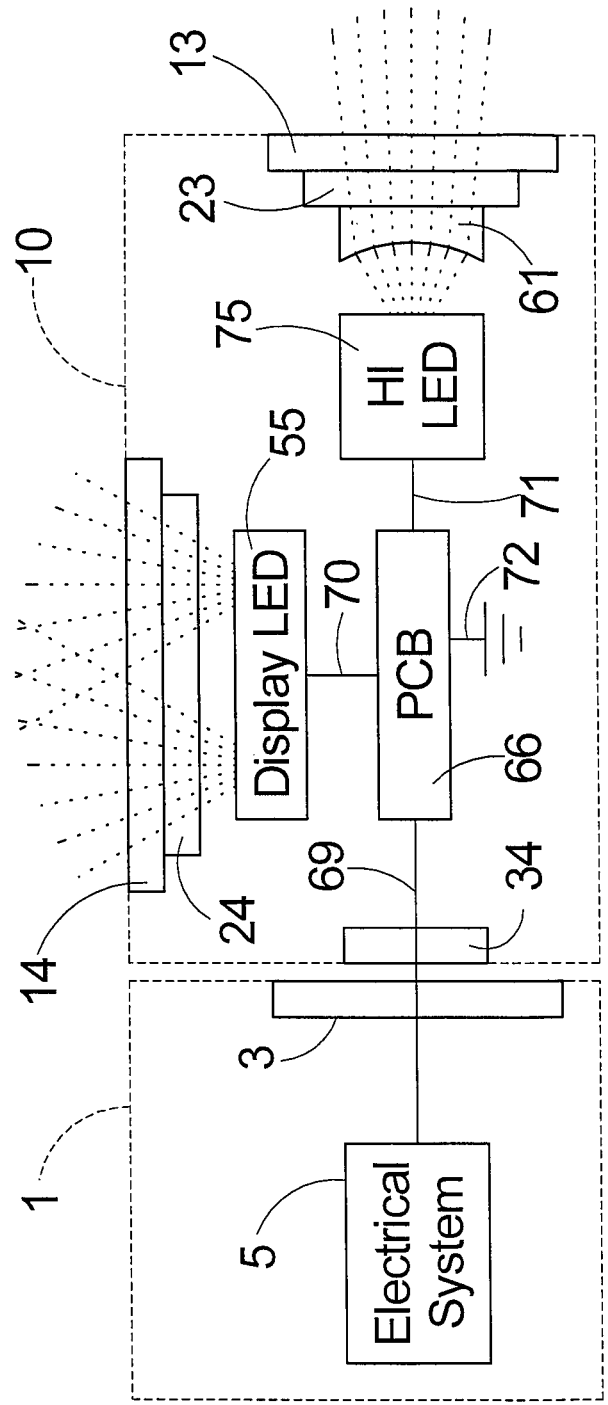

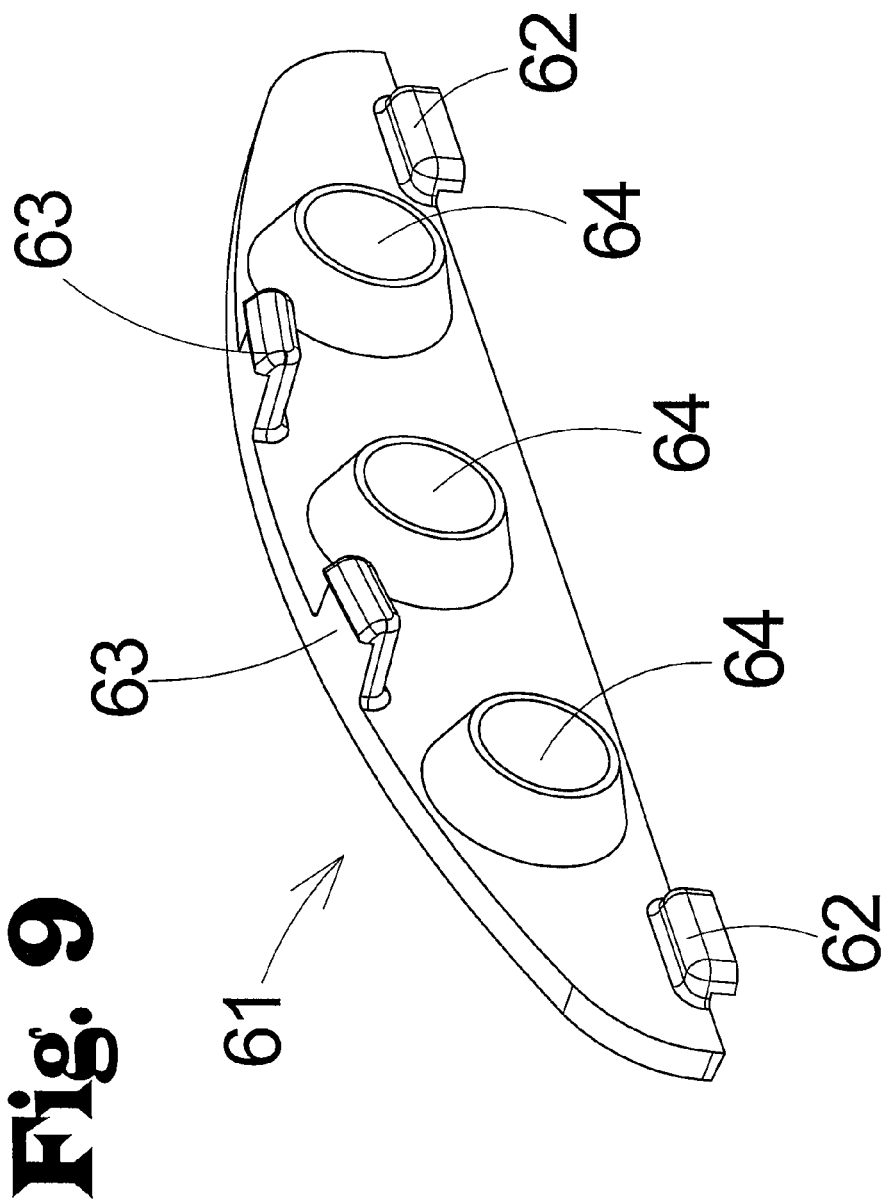

NON-INVASIVE HIGH INTENSITY LED DOCKING LIGHT AND METHOD FOR MOUNTING

FIELD OF THE INVENTION

The present invention relates to lights for watercraft specifically for lights that illuminate docking platforms for quick, safe and efficient docking.

BACKGROUND OF THE INVENTION

Unlike the automobile industry, which integrated headlights to vehicles very early in their history, the developmental progression for watercraft, like that of aircraft, has not required much innovation in this area due to their unique uses. Although headlights mounted on boats are not unknown there are many drawbacks to the integration and application of automobile technology to watercraft.

One of the major problems is the large power draw to the electrical system of a small watercraft when utilizing incandescent, halogen or xenon type lighting as commonly used in the automotive industry. A more practical solution would be the application of light emitting diodes (LEDs) but standard LEDs lack the volume or intensity necessary for adequate illumination for the needs when trying to safely dock a water craft. High intensity LEDs would be sufficient to the task but include thermal issues that raise thermal and electrical obstacles to their application on the hull of a small watercraft.

The electrical systems of most watercraft are rudimentary and vary depending on the use of the engine or the charge of the battery, and this results in uneven or unreliable illumination for lights connected thereto. Most lights do not include the necessary circuitry for managing the variability of such an unpredictable system and require that the operator try to control engine speed or turn off other electrical devices to generate the required amount of illumination.

Another problem is the hesitancy of boat owners to add any such device due to the intrusive nature of installing hull mounted lighting devices, the complicated method of sealing the device and the frequent maintenance of the lighting source and the sealing method. Current standard hull mounted incandescent lamps require a sizable hole in the hull and significant means of sealing both the exterior and interior surfaces. Very often the heat generated by such lamps is self defeating to the methods to seal the lamp from the aqueous environment. The life of these incandescent lamps requires frequent replacement in comparison to LED based lighting devices.

Due to the fact that the operator's position within a boat varies greatly between various watercraft it is necessary to mount the lighting device to direct the light in a specific direction relative to the operator's position and the height of the craft and or anticipated dock type. Most hull integrated lights give the owner no such option of aiming the beam and therefore flood the area with an unnecessary amount of light which may occlude or over-emphasize the elements of the dock of which the operator needs to be aware.

With the availability of the advantages of adjustability usually comes the accompanying complicated apparatus that may cause mutability of the light focus or an over-complication of the mounting system and method.

Therefore what is needed is a hull mounted docking light with reduced power consumption, while maintaining an amount of light adequate to properly illuminate the dock. The light should advantageously mount to the hull of various watercraft in a non-intrusive and simple manner. The lighting device should also be able to manage any thermal issues that the device itself may generate and administer to any electrical interference, inadequacy or irregularity that are common when dealing with the electrical system of small watercraft without operator intervention. The light directed from the device should preferably also be adjustable in relation to the mounting means at the time of mounting so that the type of watercraft, the position of the operator and the anticipated docking situations can be taken into consideration and proper mounting for directing the light can be achieved.

SUMMARY OF THE INVENTION

To meet these needs, the present invention provides a docking light that not only efficiently illuminates a docking area but does so in a manner that is cheap, easy and dependable with a limited amount of maintenance and an installation method that is non-intrusive yet adjustable to the needs of the particular watercraft and its use.

One aspect of the present invention is that the docking light utilizes a high intensity LED light source that significantly reduces power consumption in comparison to incandescent light sources while achieving a comparable amount of illumination for docking.

Another beneficial aspect of the present invention is that the base and bezel act as a passive heat sink to distribute the heat generated by the high intensity LEDs without the need of an active cooling system.

Yet another aspect of the present invention includes circuitry for regulating the power to the LED light source from the rudimentary and frequently insufficiently powered electrical system of many small watercrafts. The circuitry provides constant current to the LEDs regardless of input voltage and an EMI filter for protection against transient voltages that could otherwise damage the circuitry An additional aspect of the present invention is non-intrusive method of mounting the docking light to the hull of the boat with but a single small throughput to run the electrical conductors.

A further beneficial aspect of the invention is the inclusion of a set of temporary mounting fasteners that are adjustable prior to final mounting so that the directed light from the docking light can be tested and or fine-tuned to the specific characteristics of the watercraft including the hull design, the placement of the operator or the design of the dock.

A still further aspect of the present invention is the low profile and streamline design of the docking light which minimizes aerodynamic drag and reduces the likelihood of damage through collision. The compact design also enhances the rugged robustness of the unit overall which decreases the likelihood of damage.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein:

FIG. 6 is an exploded perspective view of an embodiment of the internal components of the present invention.

FIG. 7 is a cross sectional view of an embodiment of the present invention.

FIG. 8 is a diagram of an embodiment of the various active components of the docking light.

FIG. 9 is a perspective view of an embodiment of the optic lens.

DETAILED DESCRIPTION OF THE PREFERRED EMBODIMENTS

In the following detailed description, reference is made to the accompanying drawings which form a part hereof, and in which is shown by way of illustration specific embodiments in which the invention may be practiced. These embodiments are described in detail sufficient to enable those skilled in the art to practice the invention, and it is to be understood that other embodiments may be utilized and that structural, logical and mechanical changes may be made without departing from the spirit and scope of the present invention. The following detailed description is, therefore, not to be taken in a limiting sense, and the scope of the present invention is defined by the appended claims.

Figure 1:
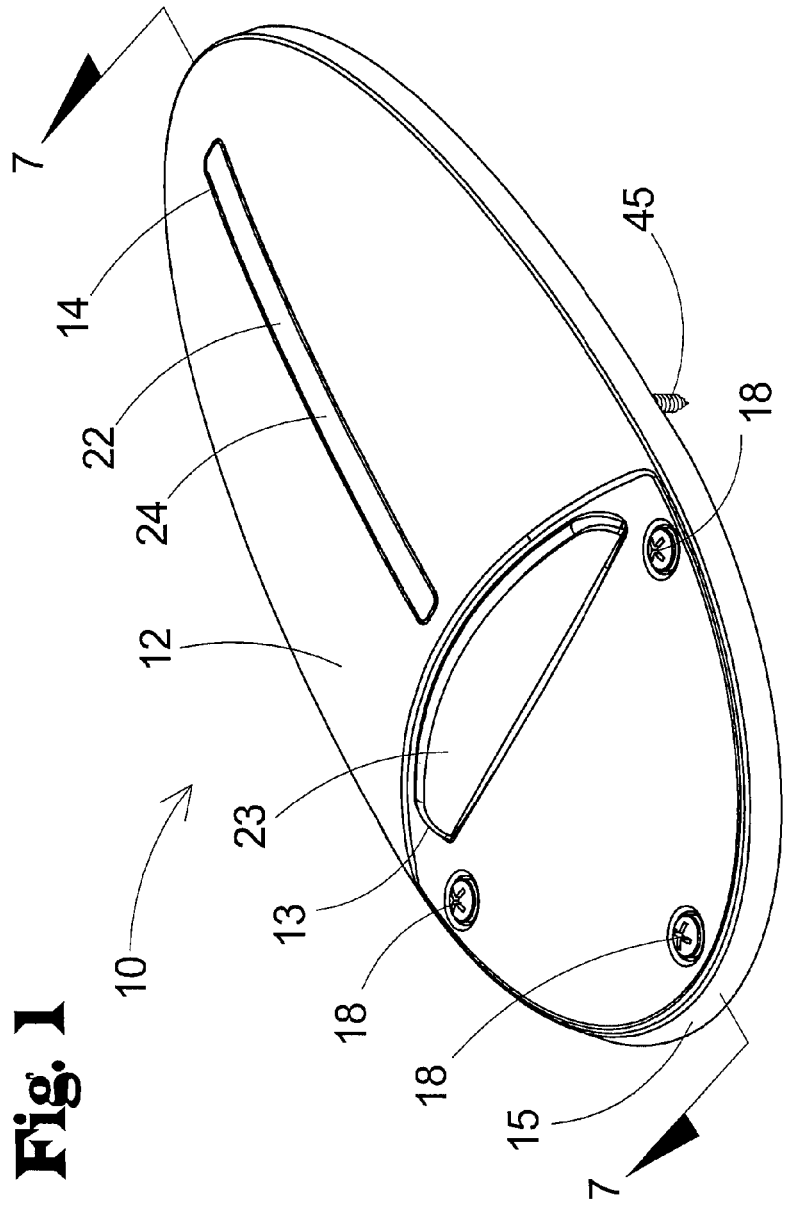
FIG. 1 is perspective view of an embodiment of the present invention.

Illustrated in FIG. 1 is an embodiment of a docking light (10) in its fully assembled state, as it would be situated when mounted to the hull (3) of a watercraft (1). The bezel (12) has low profile and is formed in a streamlined manner so as to reduce drag and to decrease the likelihood of impact with other articles around which a watercraft (1) may operate. The bezel (12) forms a protective shell, shielding the docking light (10) against damage from collisions. Elements of the blister (22) are visible through the openings in the bezel (12). The projecting window (23) is visible through the projecting aperture (13) and the display window (24) can be seen through the display aperture (14). The bezel fasteners (18) are visible near the bezel edge (15) and a portion of a hull fastener (45) is visible projecting below the interior face (32) of the base (31). The internal components (48) are fully enclosed and sealed under the blister (22) and the bezel (12).

Figure 2:
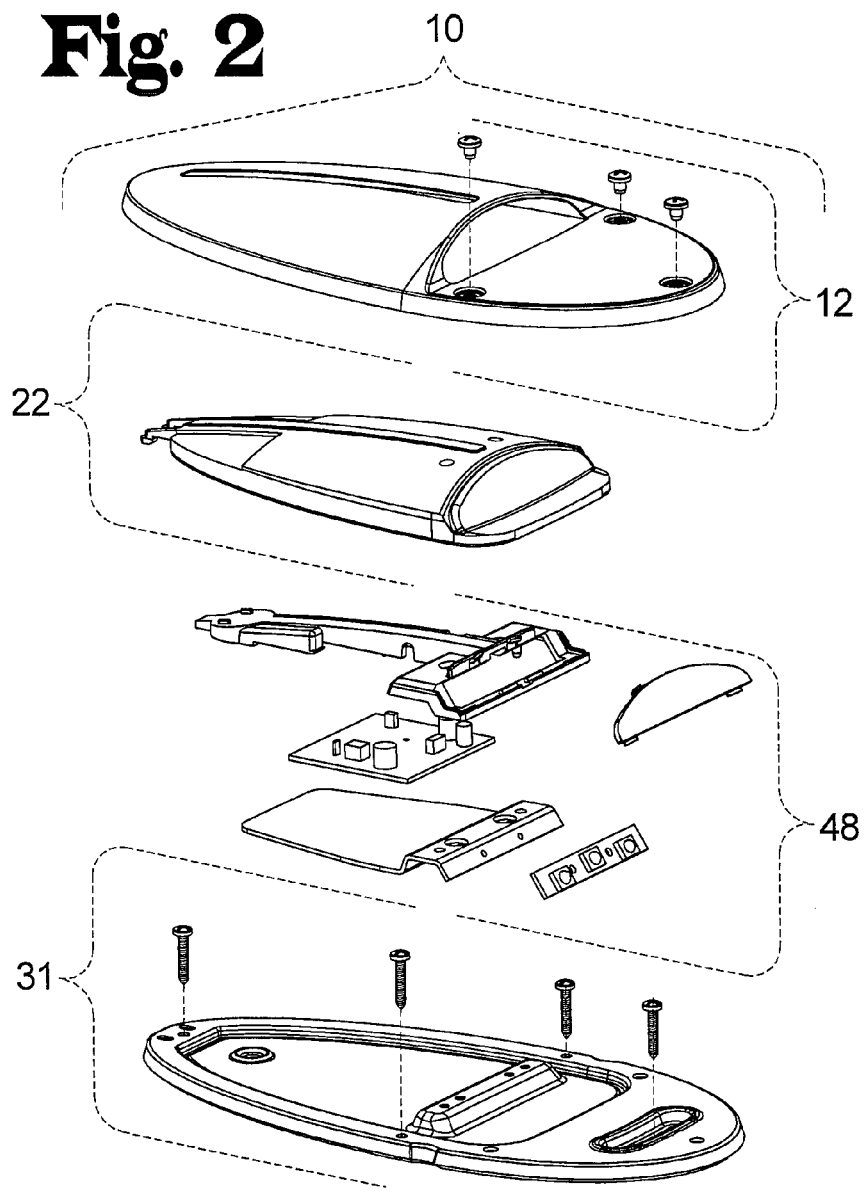
FIG. 2 is an exploded view of an embodiment of the present invention.

FIG. 2 illustrates the major subassemblies of an embodiment of a docking light (10), namely; the bezel (12) and its constituent elements and related components, the blister (22) and its constituent elements, the base (31) and its constituent elements and related components and the internal components (48) including the subgroups of the assembly jig (50), the optic lens (61), the printed circuit board (66), the high intensity LED (75) and the heat sink (78) along with their constituent elements and related components. All of the components are designed to fit together to achieve optimal operational function with a limited amount of protuberance above the surface formed by the hull (3) of the watercraft (1) that the docking light (10) is mounted upon.

Figure 3:
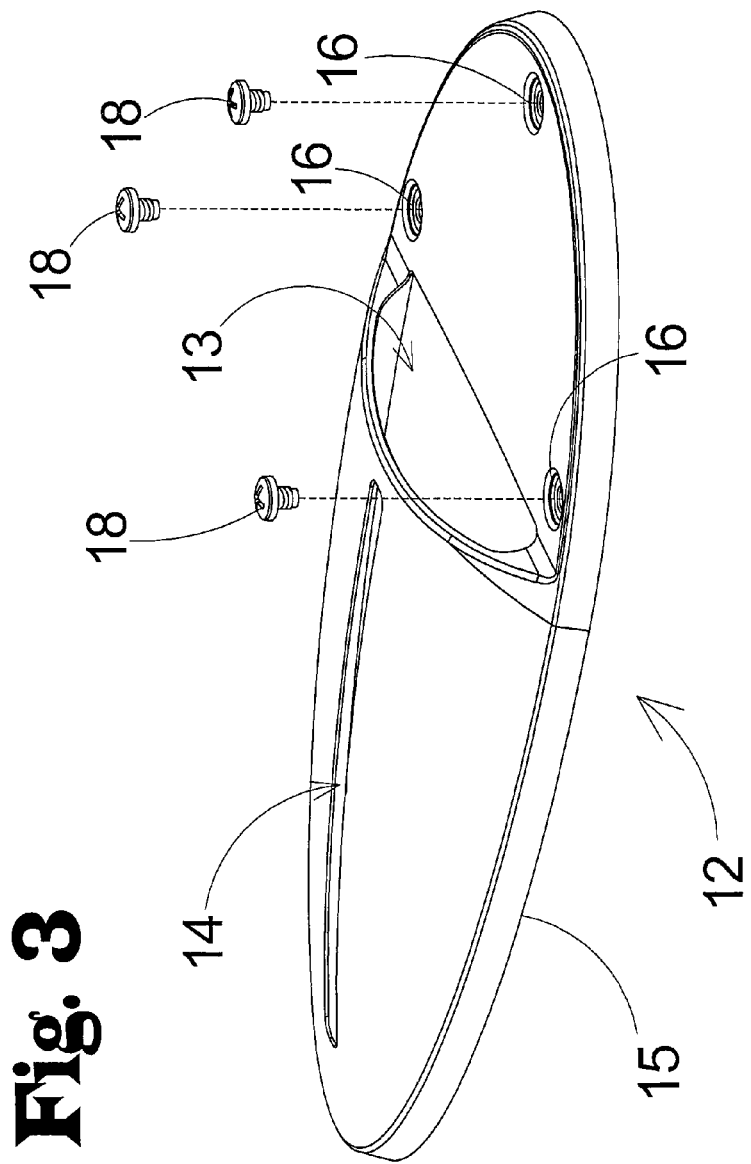
FIG. 3 is a perspective view of an embodiment of the bezel of the present invention.

FIG. 3 depicts an embodiment of the bezel (12) of a docking light (10). The bezel (12) may be constructed from a relatively sturdy and rigid material, resistant to the wet environment consistent with an area of that the hull (3) of a watercraft (1) would normally operate in, resilient enough to protect the docking light (10) against bumps, scrapes collisions likely to occur in normal operation and heat resistant enough to keep its operational integrity considering the heat of internal components (48). Acceptable materials for the bezel (12) may include metals such as steel, bronze, brass, titanium, magnesium, or related alloys.

Positioned at an angle beneficial for proper illumination is the projecting aperture (13). This opening is designed to fit closely around the projecting window (23) of the blister (22). Likewise the display aperture (14) will fit closely around the display window (24) of the blister (22). In the illustrated embodiment the display aperture (14) is a simple line running along a portion of the docking light's (10) length but the invention is not so limited. It is anticipated that the display aperture (14) could include a plurality of shapes, symbols, text, or other indicia formed as openings in the bezel (12) as desired.

The bezel (12) includes a bezel edge (15) that runs along the perimeter of the bezel (12). The inner surface of the bezel edge (15) is designed to nest with the nesting rim (42) of the base (31). The interface between the bezel edge (15) and the nesting rim (42) may be engineered with close tolerances so as to form a water tight seal or it may include a sealing medium.

The bezel (12) is held in place through attaching means between the bezel (12) and the base (31). One such attaching means is a bezel tang (17), which engages a bezel tang receiver (44) of the base (31), as illustrated in FIG. 7. This means of attachment allows the bezel (12) to open in relation to the base (31) in a clamshell manner. The illustrated embodiment uses the tang and receiver attaching means along with a number of nonintegrated bezel fasteners (18) which are passed through bezel throughputs (16) in the bezel (12) and engage the base (31) through the agency of bezel fastener receivers (40). The illustrated bezel fasteners (18) and bezel fastener receivers (40) are in the form of threaded screws and threaded receiving cavities but the invention is not so limited, as it is anticipated that a variety of other fasteners, such as expanding bolts, locking couplers, spring link, eye bolt & cotter pin, etc. may be employed for a similar effect. It is important that the attaching means be removable so that the internal components (48) are available for maintenance/replacement or the means for mounting are accessible for adjustable mounting of the docking light (10).

Figure 4:
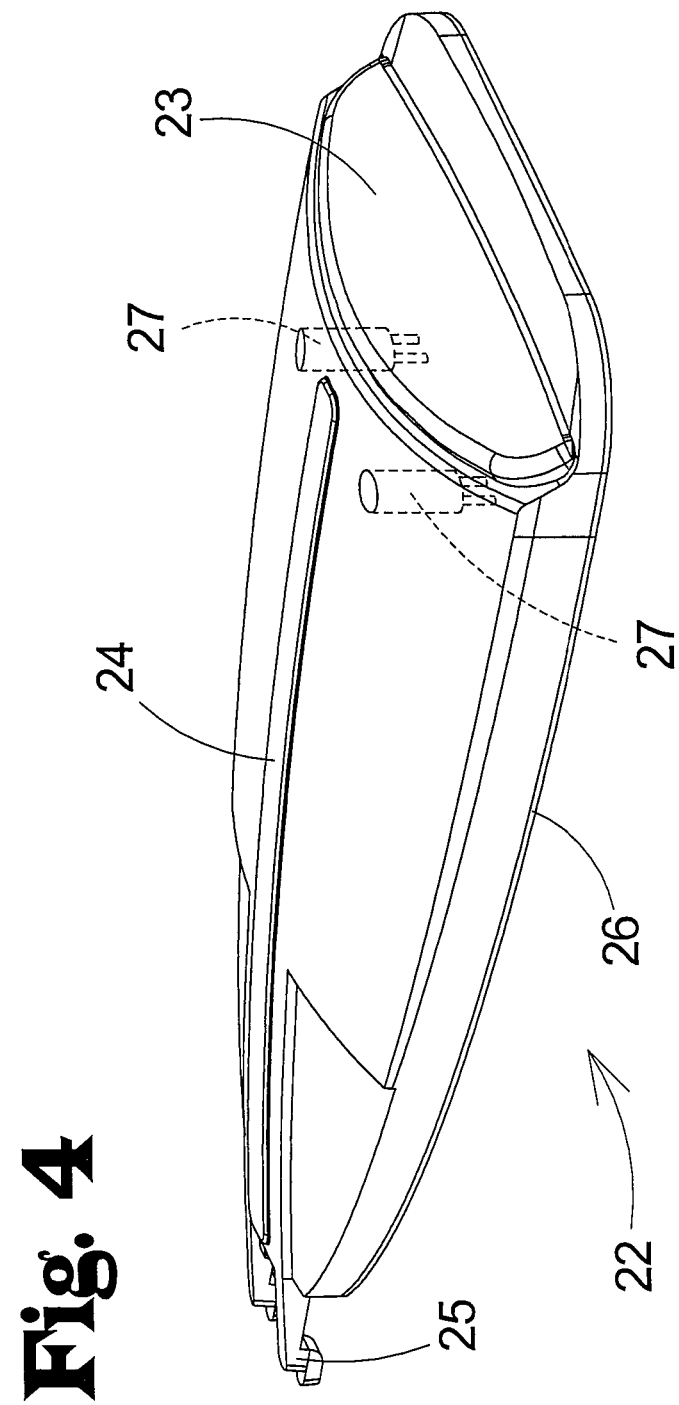
FIG. 4 is a perspective view of an embodiment of the blister of the present invention.

FIG. 4 illustrates an embodiment of a blister (22). The blister (22) includes a projecting window (23) which allows light to be projected through. The projecting window (23) is therefore translucent up to the point of being fully transparent. The projecting window (23) is placed over, if not in direct contact with the optic lens (61) and positioned to fit within the projecting aperture (13) of the bezel (12). Likewise the display window (24) is also translucent and placed over the display LED (55) and positioned to fit within the display aperture (14) of the bezel (12). It is anticipated that, for simplicity, the entirety of the blister (22) may be constructed from translucent material. In an alternate embodiment the substance of the blister (22) could act to transmit or distribute light from the high intensity LED (75) throughout the blister (22) so that any portion of the blister (22) exposed through the bezel (12) would allow the light to escape, much in the manner of a light pipe, and therefore be illuminated without the need for a display LED (55). This concept may be combined with the aforementioned plurality and or variety of shapes symbols, text, or other indicia formed in the bezel (12). The blister (22) may be formed as a single piece of durable material either entirely translucent or with translucent/transparent portions. Such materials may include glass, or a plastic substance, such as an acrylic, polycarbonate or polyvinyl.

The shape of the blister (22) is concave so that the internal components (48) can fit within a space or compartment formed between the blister (22) and the blister recess (35) of the base (31). For the ease of assembly the blister (22) includes a hinge tab (25) that engages the hinge tang receiver (36) of the base (31) so that the blister (22) may be closed in the same clamshell manner in relation to the base (31) as the bezel (12). The blister (22) is designed to fit into the blister recess (35) of the base (31). The tolerances of the blister (22) and the blister recess (35) may be manufactured in such a manner that a water tight seal is formed when the blister (22) is nested within the blister recess (35). Alternately the bottom rim of the blister (22) or the sides or bottom of the blister recess (35) may include a blister gasket (26) that provides a water tight seal between the blister (22) and the base (31) insuring that the internal components (48) remain dry. Alternately the blister (22) can be sealed into the blister recess using an adhesive cement.

For ease of assembly and to insure the proper placement of the internal components (48) within the blister (22) a pair of aligning pins (27) is included within the interior cavity formed by the blister (22). The aligning pins (27) keep certain of the internal components (48) in a fixed relationship with the blister (22) and base (31) assuring proper function. The aligning pins (27) connect to the central pedestal (43) to assure correct placement and to add structural integrity. In the embodiment, illustrated in the figures, the aligning pins (27) are fixed to the top of the central pedestal (43) through the agency of portions of the aligning pins (27) passing through the central pedestal (43) where they are engaged by a fastener or, alternatively, adhered by a fixing substance such as electrical potting, epoxy or cement like medium. Various alternative methods of attaching the aligning pins (27) to the central pedestal (43) are anticipated and are generally known to those skilled in the art.

Figure 5:
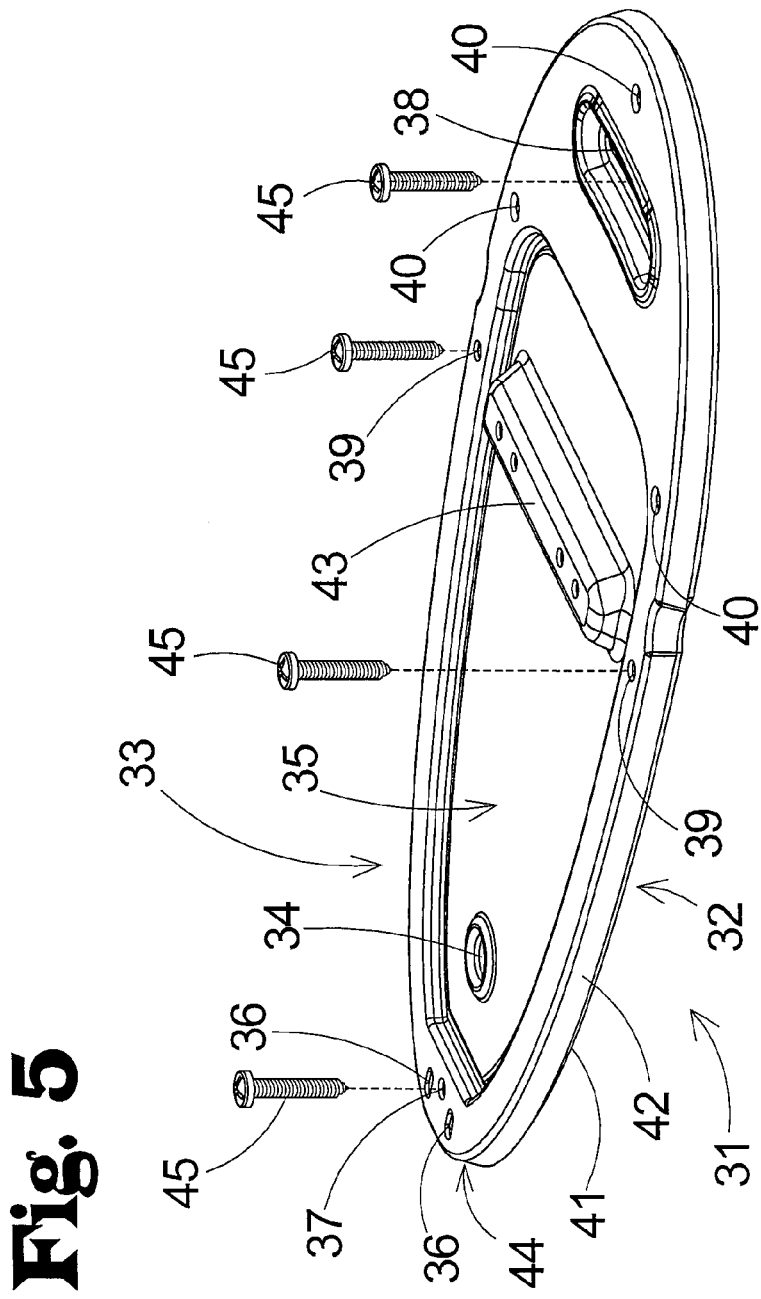
FIG. 5 is a perspective view of an embodiment of the base of the present invention.

FIG. 5 in an embodiment of the base (31). The side of the base (31) that is placed against the hull (3) of a watercraft (1) is referred to as the interior face (32). The interior face (32) includes a base gasket (41) that is meant to seal the base (31) against the hull (3). The base gasket (41) may cover the entirety of the interior face (32) or may be comprised of a ring around the perimeter of the base (31). If the base gasket (41) is in the form of a ring, the base gasket (41) may also include a second ring encircling the conductor conduit (34). The main function of the base gasket (41) is to seal the hull (3) against water intrusion but it also serves the function of mitigating the seal over any minor curvature of the hull (3) and protecting the docking light (10) against the vibrations associated with the operation of watercraft (1).

The exterior face (33) of the base (31) includes a blister recess (35) which receives the blister (22) in a manner as to seal the internal components (48) against water intrusion. To properly engage the blister (22) into the blister recess (35), a hinge tab receiver (36) is included within the base (31) that engages the hinge tab (25) of the blister (22). After engaging the blister (22) to the base (31) in the manner described between the hinge tab (25) and the hinge tab receiver (36), the blister (22) may be hinged close thus providing the correct union between blister (22) and base (31).

The conductor conduit (34) is an opening between the exterior face (33) and passing through to the interior face (32) of the base (31). The purpose of the conductor conduit (34) is to pass the incoming conductors (69) connecting the internal components (48) to the electrical system (5) of the watercraft (1). The size of the conductor conduit (34) may be made wide enough to allow for a degree of adjustability in mounting the docking light (10) without the need to create additional holes through the hull (3) for the incoming conductors (69).

Within the blister recess (35) is the central pedestal (43) to which the heat sink (78) conforms and the high intensity LED (75) is set against for proper positioning. To the exterior face (33) side of the central pedestal (43) there are throughput holes intended to receive projections of the aligning pins (27) of the blister (22).

Along the perimeter of the base (31) is a nesting rim (42) that is designed to conform to the corresponding inner surface of the bezel edge (15) of the bezel (12) as to make a seal to resist vibration and water intrusion. Also included in the base (31) are means to attach the bezel (12) to the base (31) so that the blister (22) and the internal components (48) are securely sandwiched in between. Such means include a bezel tang receiver (44) and bezel fastener receivers (40). The bezel tang receiver (44) in the illustrated embodiment comprises an opening in the nesting rim (42) into which the bezel tang (17) of the bezel (12) may be inserted. The bezel fastener receivers (40) in the illustrated embodiment take the form of threaded holes designed to receive the bezel fasteners (18) which in this embodiment consist of screws.

The base (31) is mounted to the hull (3) of the watercraft (1) by a variety of mounting means. Such means for mounting the docking light (10) include the agency of hull fasteners (45). In the embodiment depicted in the drawings the hull fasteners (45) take the form of wood screws but the invention is not so limited. Alternate forms of hull fasteners (45) such as nut and bolt combinations, tension bolts, spring biased pins, binding catches, spring clips, rotating hook locks or even such means as suction cups or adhesives may be anticipated by those of skill in the art.

Specific to the embodiment wherein the hull fasteners (45) comprise wood screws, holes would be provided within the base (31) to allow passage of the threaded portion of the screw and to retain the head of the screw so as to secure the base (31) to the hull (3). The pivot hole (37) is one such hole located at one end of the base (31). The mounting slot (38) is also an example of such a hole but with supplementary utility. The opening of the mounting slot (38) comprises an elongated break in the base (31) spanning an arc relative to the pivot hole (37) so that when hull fasteners (45) within the pivot hole (37) and the mounting slot (38) are engaged to the hull (3) but not fully tightened down, the base (31) is able to swivel axially relative to the pivot hole (37). This feature permits the docking light (10) to be secured to the hull (3) of the watercraft (1) while allowing a limited degree of movement to the docking light (10) so that the focus of the light emitted from the docking light (10) can be fine-tuned to the characteristics of the boat, driver and typical docking environment. Once the optimal angle for the light is determined hull fasteners (45) may be passed through the mounting holes (39) and into the hull (3) to securely fix the base (31) and therefore the docking light (10) in the desired manner.

FIG. 6 is an exploded view of the internal components (48) of an embodiment of the docking light (10). The internal components (48) are located in the cavity formed between the blister (22) and the blister recess (35) of the base (31). This cavity is sealed against the outside environment and preserved against intrusion by water so that the electrical components may work properly.

The assembly jig (50) is central to maintaining the proper relationship and placement of the various internal components (48). The assembly jig (50) comprises a spine (54) along its length for structural stability and to provide an area to place the display LEDs (55). An array of one or more display LEDs (55) may be surface mounted to a flexible film circuit board which may be mounted to the spine (54) with an adhesive. The spine (54), in the illustrated embodiment, is placed in directly under the display window (24) of the blister (22) and subsequently relative to the opening of the display aperture (14) of the bezel (12) so that the light generated by the display LEDs (55) is readily visible. In alternate embodiments the spine (54) may occupy other areas in relation to the blister (22) and openings in the bezel (12) to provide light to other illuminated shapes symbols, text, or other indicia required by the design.

The spine (54) also forms the conductor channel (56) which encloses the incoming conductors (69) passing from the conductor conduit (34) to the printed circuit board (66). Cutouts or holes may exist in the conductor channel (56) to allow certain incoming conductors (69) to exit the conductor channel (56) and attach to the printed circuit board (66) according to the printed circuit board (66) electrical layout. The conductor channel (56) at the foot of the spine (54) of the assembly jig (50) forms an enclosure around the conductor conduit (34) and keeps the incoming conductors (69) isolated from the other internal components (48). Located at two sections along the spine (54) are PCB clips (57) to hold the printed circuit board (66) to the assembly jig (50). The PCB clips (57) engage the printed circuit board edge (68) to keep the printed circuit board (66) from being in contact with the heat sink (78). The air in between the heat sink (78) and the printed circuit board (66) acts as an insulator to prevent heat transfer from the heat sink (78) to the printed circuit board (66). The heat sink lip (58) assures the gap between the heat sink (78) and the printed circuit board (66) by holding the heat sink (78) against the surface of the bottom of the blister recess (35) of the base (31).

At the end of the spine (54) opposite of the enclosure for the conductor conduit (34) is the section of the assembly jig (50) that holds the optic lens (61). The optic lens (61) is held in place by one or more lens tabs (62) which are inserted into the lens slots (52) so that the lens engaging clip (63) of the optic lens (61) can connect to the lens retaining clip (53) of the assembly jig (50). This system of tabs, slots and clips is but one embodiment of methods that may be used to hold the optic lens (61) in proper relation to the high intensity LED (75) and many variations of the positioning and assembly method are known to those skilled in the art.

A pair of jig aligning holes (51) is depicted in the assembly jig (50) to pass the aligning pins (27) of the blister (22) through for correct positioning of the assembly jig (50) and the internal components (48) attached thereto within the base (31) and blister (22). One or more jig pins (59) may also be integrated into the assembly jig (50). The function of the jig pin (59) is to assure that the assembly jig (50) is positioned at the proper distance above the central pedestal (43) or alternately above the heat sink (78). A portion of the end of the jig pin (59) may pass through the heat sink (78) and possibly the central pedestal (43) to be secured on the interior face (32) side of the base (31) much in the same manner of the aligning pins (27).

FIG. 6 illustrates a plurality of high intensity LEDs (75) in use but the invention is not so limited as the invention may be practiced with a single high intensity LED (75) or an array of many high intensity LEDs (75). Depicted are three high intensity LEDs (75) mounted to a thermally transmissive plate (76). The thermally transmissive plate (76) may include a layered circuit board to electrically connect the high intensity LEDs (75) together for ease of subsequent connection to the printed circuit board (66), or it may not include such circuitry depending instead upon a direct wired connection between the high intensity LED (75) and the printed circuit board (66).

The high intensity LED (75) and the thermally transmissive plate may be held in place by a plurality of means, including but not limited to the opening in the assembly jig (50), the nesting of the high intensity LEDs (75) into the concave topography of the optic lens (61) and/or connection to the heat sink (78) or directly to the central pedestal (43) of the base (31). FIG. 6 demonstrates a pair of holes in both the thermally transmissive plate (76) and the heat sink (78) through which a fastening member may be passed, such as a screw, bolt, pin or rivet. Between the thermally transmissive plate (76) and the heat sink (78) there is located a thermally conductive material known as thermal grease (80), thermal flux or thermal paste that is used to provide a more efficient transfer of heat between heat conductive components that are in contact with one another. The thermal grease (80) may also assist in keeping the thermally transmissive plate (76) in place.

The purpose of the heat sink (78) is to distribute heat generated by the high intensity LEDs (75) throughout the docking light (10) so that the functional elements within the docking light (10) are not adversely affected. The heat sink (78) is made from a durable material that has excellent heat conductance such as aluminum or copper. The heat sink (78) is retained in its proper location by the aligning pins (27) of the blister (22) passing through the sink aligning holes (79) of the heat sink (78) and also by the heat sink lip (58) of the assembly jig (50). The heat sink (78) is in physical and thermal contact with the bottom of the blister recess (35) of the base (31). The area between the heat sink (78) and the base (31) at the bottom of the blister recess (35) and the central pedestal (43) may include thermal grease (80) to aid the transference of heat. The heat once distributed through the heat sink (78) is distributed throughout the base (31) and further out to the bezel (12) through their connection at the nesting rim (42) and bezel edge (15). The heat sink (78) is held in place through the agency of the aligning pins (27) of the blister (22) passing through the sink alignment holes (79) of the heat sink (78). The paths of the aligning pins (27) through the assembly jig (50) and the heat sink (78) are designated in FIG. 6 by the dash-dot lines labeled (AP).

The printed circuit board (66) contains the functional electrical circuits that power and control the docking light (10). The mounted components (67) on the printed circuit board (66) may be located on the side of the printed circuit board (66) that faces away from the heat sink (78) so that the physical printed circuit board (66) would act to shield the mounted components (67) from heat. The printed circuit board (66) is held in place by the assembly jig (50) by PCB clips (57) attached to the printed circuit board edge (68). The printed circuit board (66) is the hub for all of the electrical conductors within the docking light (10). The incoming conductors (69) connect the printed circuit board (66) with the electrical system (5) of the watercraft (1). The display conductors (70) connect the printed circuit board (66) to the display LEDs (55). The projector conductors (71) connect the printed circuit board (66) to the high intensity LEDs (75). The grounding conductor (72) is grounded to the base (31), possibly via the heat sink (78).

FIG. 7 is a cross sectional view of an embodiment of the docking light (10). It is apparent from the density of the components that the docking light's (10) low profile is a major consideration in its design. In the embodiment depicted in FIG. 7 the base gasket (41) is a ring of compressible material lining the perimeter instead of a solid sheet covering the entire interior face (32). In this view the bezel tang (17) can be seen engaged into the tang receiver (36). This view also reveals the concavity (64) of the optic lens (61) that conforms to the light emitting surface of the high intensity LED (75).

The space between the printed circuit board (66) and the heat sink (78) is made evident as the PCB clips (57) and the heat sink lip (58) are seen engaged to their respective components.

The circuitry within the printed circuit board (66) may include many functions including; controlling electric current to the high intensity LED (75), controlling electric current to the display LED (55), providing a constant stable current to either type of LED regardless of input voltage provided from the watercraft's (1) electrical system (5), managing power consumption of the docking light (10), optimizing light output according to available current, reporting the status of; the high intensity LED (75), display LED (55) and/or any functional circuitry monitored, and/or reducing the electromagnetic interference generated by the docking light (10) or it's constituent components. The cross-section of the optic lens (61) shows the concavity (64) that covers the high intensity LED (75) and focuses the light into a tighter directional beam. The joining of the blister (22) within the blister recess (35) in this embodiment uses no blister gasket (26) relying instead on manufacturing both pieces to close tolerances to achieve a water tight fit.

FIG. 8 illustrates an example of the functional electrical elements of the docking light (10). The printed circuit board (66) is connected to the watercraft's (1) electrical system (5) via the incoming conductors (69) that pass through the conductor conduit (34) and hull (3). From the printed circuit board (66) display conductors (70) are attached to the display LEDs (55). The light generated from the display LEDs (55) passes through the display window (24) of the blister (22) and further through the display aperture (14) of the bezel (12). The high intensity LEDs (75) are connected to the printed circuit board (66) by the projector conductors (71). The light generated from the high intensity LEDs (75) passes through an optic lens (61) in which the light is directionally focused, then through the projecting window (23) of the blister (22) and out through the projecting aperture (13) of the bezel (12). The printed circuit board (66) is grounded to the base (31) and bezel (12) of the docking light (10) through the grounding conductor (72) either directly or via the heat sink (78)

FIG. 9 is included to illustrate the concavities (64) on the inner side of the optic lens (61) and the full set of lens tabs (62) and lens engaging clips (63) as they are not entirely evident from the other drawings of this particular embodiment.

The method of mounting the docking light (10) to a water craft (1) would commonly follow a procedure starting with choosing the general area within the front section of the hull (3) to mount the docking light (10). Through the use of a template or by utilizing the base (31) as a template the location of the hole in the hull (3) corresponding to the conductor conduit (34) through which the incoming conductors (69) may be run is marked. A minimally invasive hole, only large enough for the incoming conductors (69), may then be drilled in the hull (3). Using the same marking method, holes for hull fasteners (45) corresponding to the pivot hole (37) and mounting slot (38) may be pre-drilled with pilot holes. The base (31) may then be mounted by engaging hull fasteners (45) through the pivot hole (37) and the mounting slot (38). The internal components (48) are already preassembled within the blister (22), and the blister (22) sealed against the base (31) within the blister recess (35). The bezel tang (17) is then inserted into the bezel tang receiver (44) so that the blister (22) is sandwiched between the bezel (12) and the base (31). The bezel fastener/s (18) are then slipped through the bezel (12) throughput/s and engage the bezel fastener receiver/s (40). Once the incoming conductors (69) are properly connected to the watercraft's (1) electrical system (5) the docking light (10) can be operationally verified to see if the light output from the high intensity LED (75) is focused correctly for the specific placement of the operator, configuration of the boat or the particular dock set up desired. At this point the docking light (10) is fully functional but may be repositioned in an arc, in relation to the pivot hole (37) to redirect the light output, as the hull fastener (45) engaged to the mounting slot (38) will allow a degree of movement. Adjustment or fine tuning of the light output may be tested in several instances before fixing the position of the docking light (10). Once optimal focus of the light is achieved the position of the docking light (10) may be made permanent by removing the bezel (12) to gain access to the mounting hole/s (39) and passing hull fastener/s (45) through the mounting hole/s (39) and into the hull (3). This method of mounting a docking light (10) combined with flexible design features and components, allow for custom adjustability after being operationally verified along with a secure and stable attachment.

It should be appreciated from the foregoing description and the many variations and options disclosed that, except when mutually exclusive, the features of the various embodiments described herein may be combined with features of other embodiments as desired while remaining within the intended scope of the disclosure.

It is to be understood that the above description is intended to be illustrative, and not restrictive. Many other embodiments and combinations of elements will be apparent to those skilled in the art upon reviewing the above description and accompanying drawings. The scope of the invention should, therefore, be determined with reference to the appended claims, along with the full scope of equivalents to which such claims are entitled.

What is claimed is:

1. A docking light comprising:
    a base that attaches to the hull of a watercraft, including;
        a bezel fastener receiver,
        a bezel tang receiver, and
        a blister recess that conforms to the shape of the blister;
    a light transmissive blister attached to the base, including;
        a concave shape,
        a hinge tab, and
        an aligning pin;
    a bezel attached to the base and overlying the blister, including;
        an aperture for passing light from within the blister,
        bezel tang, and
        a bezel throughput;
    a high intensity LED below the blister;
    a display LED below the blister;
    a printed circuit board; below the blister
    an optic lens, that directs the light from the high intensity LED in a beam that is in a direction angular to the hull; and
    a heat sink below the blister for distributing heat generated by the high intensity LED throughout the docking light.

2. The docking light of claim 1, wherein the base that attaches to the hull of a watercraft further comprises a pivot hole.

3. The docking light of claim 2, wherein the base that attaches to the hull of a watercraft further comprises a mounting slot.

4. The docking light of claim 3, wherein the base that attaches to the hull of a watercraft further comprises a mounting hole.

5. The docking light of claim 4, wherein the base that attaches to the hull of a watercraft further comprises a conductor conduit.

* * * * *